United States Patent [19]
Crooks

[11] Patent Number: 5,387,765
[45] Date of Patent: Feb. 7, 1995

[54] DATA SECURE DIGITIZER CONTROL CIRCUIT AND METHOD

[75] Inventor: John F. Crooks, Duluth, Ga.

[73] Assignee: NCR Corporation, Dayton, Ohio

[21] Appl. No.: 939,218

[22] Filed: Sep. 2, 1992

[51] Int. Cl.⁶ ............................................. G08C 21/00
[52] U.S. Cl. ..................................................... 178/18
[58] Field of Search ............................ 178/18, 19, 20; 345/173, 174; 341/33

[56] References Cited

U.S. PATENT DOCUMENTS

| | | | |
|---|---|---|---|
| 4,227,044 | 10/1980 | Fencl | 178/18 |
| 4,603,231 | 7/1986 | Reiffel et al. | 178/19 |
| 4,653,068 | 3/1987 | Kadim | 375/1 |
| 4,703,511 | 10/1987 | Conoval | 382/13 |
| 4,752,965 | 6/1988 | Dunkleu et al. | 382/3 |
| 4,853,493 | 8/1989 | Schlosser et al. | 178/18 |
| 4,902,858 | 2/1990 | Yamanami et al. | 178/19 |
| 4,922,061 | 5/1990 | Meadows et al. | 178/19 |
| 5,007,085 | 4/1991 | Greanias et al. | 380/25 |
| 5,070,325 | 12/1991 | Tanaka et al. | 340/706 |

*Primary Examiner*—Stephen Chin
*Assistant Examiner*—Kevin Kim
*Attorney, Agent, or Firm*—Paul W. Martin

[57] ABSTRACT

A secure digitizer control circuit and method which drives the digitizer with a random series of excitation signals. The control circuit includes a digitizer and a plurality of drivers for driving the digitizer. A controller varies the excitation signal and calculates stylus position. A stylus detects the potential at a point on the digitizer. Processing circuitry, including an analog front end and an analog-to-digital (A/D) converter, rectifies and filters the stylus signal and applies it to the A/D converter. An input/output link provides an interface between the control circuit and a host computer, such as a point-of-service terminal. A memory stores a lookup table of drive pattern sets and corresponding position equations. In a first embodiment, the controller repeatedly chooses a random sequence of patterns and applies the sequence until the controller senses liftoff of the sensing means from the digitizer. In a second embodiment, controller means repeatedly chooses and applies a sequence of patterns.

9 Claims, 4 Drawing Sheets

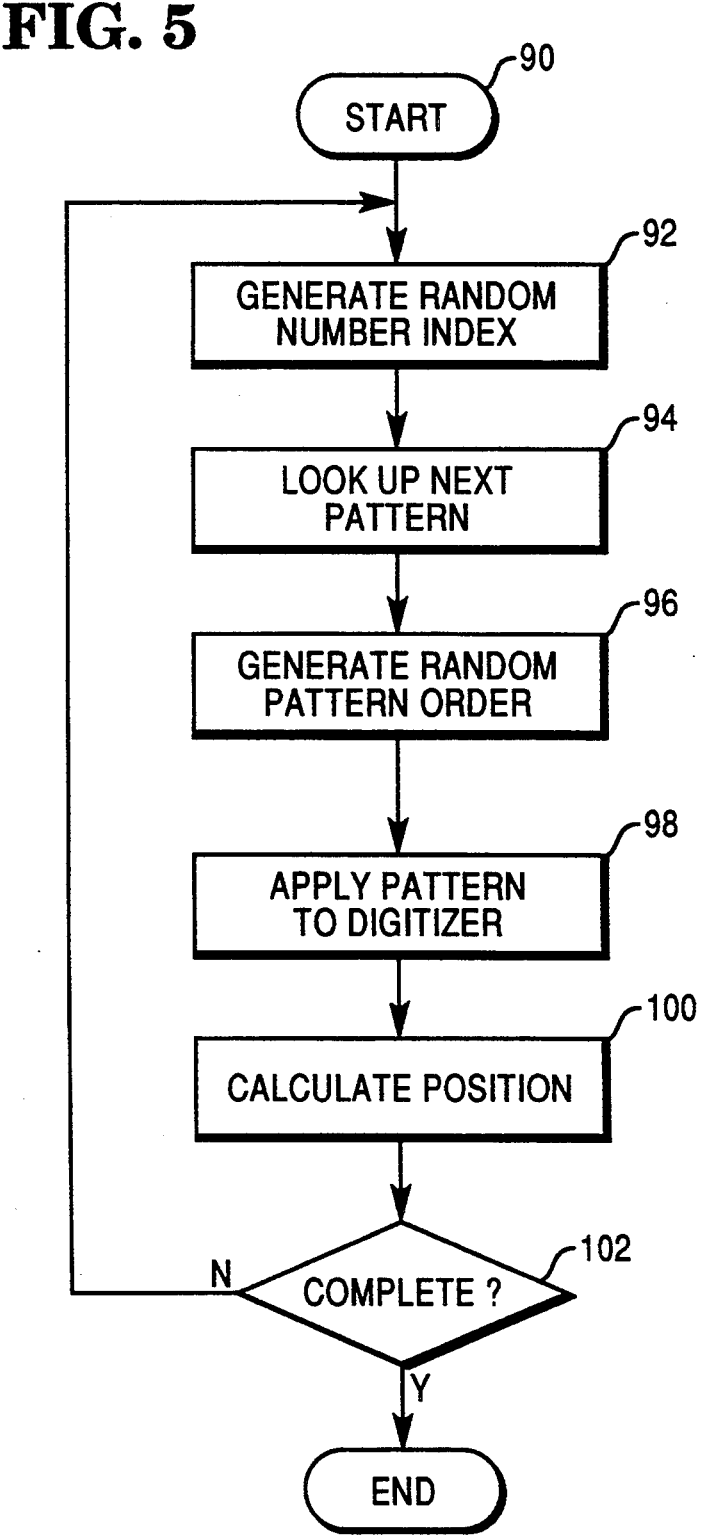

DATA SECURE DIGITIZER CONTROL CIRCUIT AND METHOD

CROSS-REFERENCE TO RELATED APPLICATIONS

The present invention is related to the following commonly assigned and co-pending U.S. applications:

"Write Input Transaction Apparatus and Method", filed Aug. 30, 1990, invented by Allgeier et al., and having a Ser. No. of 07/575,096; and "Method and Apparatus for Producing a Digitized Transaction Record Including an Encrypted Signature", filed Jan. 11, 1991, invented by Kapp et al., and having a Ser. No. of 07/640,199.

BACKGROUND OF THE INVENTION

The present invention relates to handwriting capture devices and more specifically to a data secure digitizer control circuit and method.

The conventional procedure for measuring stylus position is disclosed in U.S. Pat. No. 4,523,654, issued Jun. 18, 1985, to Schlosser et al. This patent is hereby incorporated by reference.

Many digitizer applications are at risk of being compromised by unauthorized persons who are able to tap into the digitizer and capture digitized position data. These applications include signature capture and verification, and personal identification number (PIN) capture and verification for point of sale credit or debit authorization.

Therefore, it would be desirable to provide a digitizer control circuit and method for making digitizer data secure to practically any potential data thief.

SUMMARY OF THE INVENTION

In accordance with the teachings of the present invention, a secure digitizer control circuit and method are provided. The control circuit includes a digitizer, and a plurality of drivers for driving the digitizer with a seemingly random series of excitation signals. A controller varies the excitation signal and calculates stylus position. A stylus detects the potential at a point on the digitizer. Processing circuitry, including an analog front end and an analog-to-digital (A/D) converter, rectifies and filters the stylus signal and applies it to the A/D converter. An input/output link provides an interface between the control circuit and a host computer, such as a point-of-service terminal. A memory stores a lookup table of drive pattern sets and corresponding position equations.

In a first embodiment of the present invention, the controller randomly chooses a drive pattern set and repeatedly applies it until it senses a stylus liftoff. A "drive pattern" or "pattern" is a set of states for each electrode of the digitizer. A "pattern set" is a set of patterns. The controller then chooses another pattern set and repeats the process. The first embodiment is optimal for "point and shoot" applications such as personal identification number (PIN) capture where the user is tapping the digitizer panel with the stylus.

In a second embodiment, the controller constantly varies the drive pattern stream. A "pattern stream" refers to the overall sequence of patterns which the drivers apply to the digitizer. Variation of drive pattern stream is necessary because it is a simple matter to decode a constant pattern stream if one knows that the positional data occurs in continuous lines, as it does in handwriting. This is not necessary in point and shoot applications because there is not enough continuous positional data. The second embodiment is optimal for handwriting capture, but is suitable for use in point and shoot applications as well.

It is a feature of the present invention that the stylus signal is useless unless one knows the exact manner in which the controller is driving the digitizer panel. Unlike the stylus signal, which is available externally through a cable connecting the stylus to the circuit, the drive information is physically secure within a housing around the rest of the circuit.

It is accordingly an object of the present invention to provide a data secure digitizer control circuit and method.

It is another object of the present invention to provide a data secure digitizer control circuit and method for point and shoot and signature capture applications.

It is another object of the present invention to provide a data secure digitizer control circuit and method which varies the drive pattern set and drive pattern order.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 5 is a flow diagram of a second embodiment of the method of the present invention.

DETAILED DESCRIPTION OF THE PREFERRED EMBODIMENT

Figure 1:
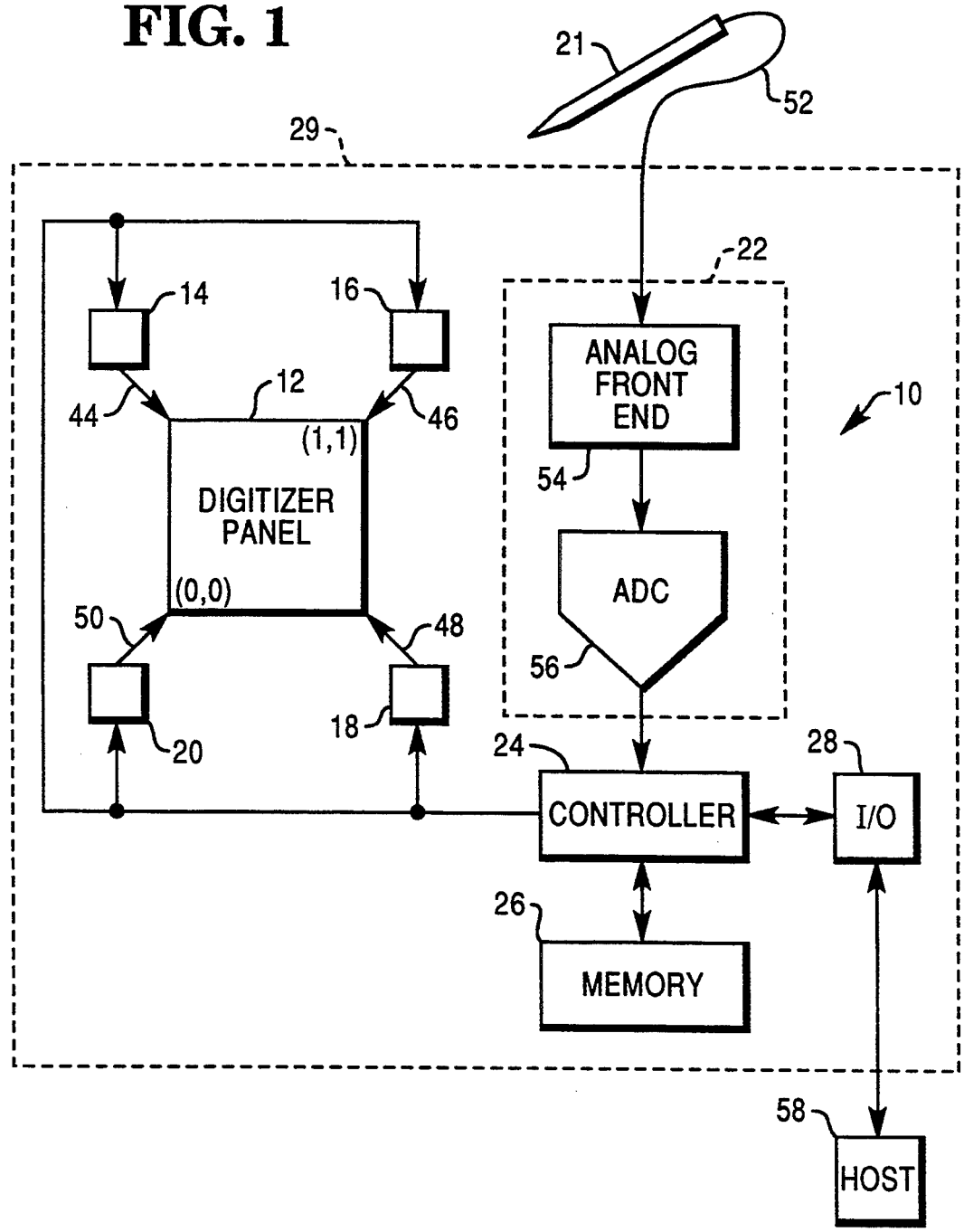
FIG. 1 is a block diagram of the data secure digitizer control circuit of the present invention.

Referring now to FIG. 1, digitizer control circuit 10 includes digitizer 12, drivers 14-20, processing circuitry 22, controller 24, memory 26, and input-output link 28, all located within an enclosure or housing 29. Digitizer control circuit 10 additionally includes stylus 21, which is located outside housing 29.

Digitizer 12 includes several electrodes deposited over a conductive coating, which is applied to an insulating substrate. Several types of digitizers are envisioned for use with the present invention. The preferred embodiment employs a digitizer having four electrodes and which is described in U.S. Pat. No. 4,853,493 issued to Schlosser et al. This patent has been incorporated by reference.

For ease of explanation, the origin of the positional coordinate system of digitizer 12 is preferably located at lower left hand connection 50. Coordinates vary from 0 to 1 in both the horizontal (x) and vertical (y) directions. Thus, upper right hand connection 46 corresponds to point (1,1).

Drivers 14-20 drive the four electrodes through connections 44-50 at the corners of digitizer 12 to known "states". A "state" is the voltage level of a given electrode at any given time. In the preferred embodiment, a given electrode can be either grounded or energized. In an alternative embodiment, a given electrode can be either grounded, energized, or left floating (undriven). A "drive pattern" or "pattern" is a set of states for each electrode of digitizer 12. A "pattern set" is a set of patterns. A "pattern stream" refers to the overall sequence of patterns which drivers 14–20 apply to digitizer 12. In other words, the pattern stream is a sequence of pattern sets. Finally, a "sample stream" refers to the composite signal leaving stylus 21 via cable 52 as a result of the pattern stream.

It is a feature of the present invention that the stylus signal is useless unless one simultaneously knows the exact manner in which the controller is driving the digitizer panel. Unlike the stylus signal, which is available externally through stylus cable 52, the drive information is physically secure within housing 29.

Stylus 21 detects the potential at a point on digitizer 12 via electrostatic coupling with the conductive coating. Stylus 21 is coupled to circuit 10 through cable 52.

Processing circuitry 22 includes analog front end 54 and analog-to-digital (A/D) converter 56. Analog front end circuitry 54 rectifies and filters the stylus signal and applies it to (A/D) converter 56.

I/O link 28 provides an interface between control circuit 10 and a host computer 58, such as a point-of-service terminal.

Memory 26 stores a lookup table of pattern sets with corresponding positional equations. The pattern sets in this table can be of any length or combination of lengths. Preferably, memory 26 is a non-volatile memory.

Controller 24 configures drivers 14–20 to drive digitizer 12 with a random excitation signal. It reads the digital output of A/D converter 56, converts the digital data to position information, and outputs the position data to an external device, such as computer 58, via I/O link 28.

Figure 3:
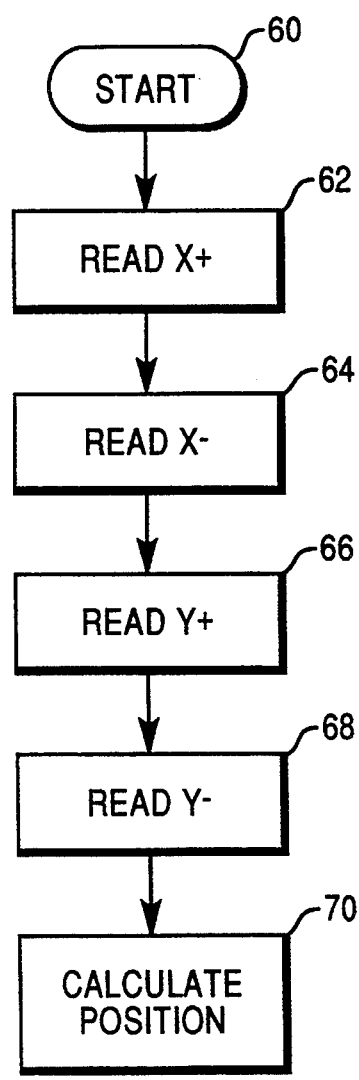
FIG. 3 is a flow diagram of a method for determining stylus position on the surface of the digitizer.

Turning now to FIG. 3, a method of determining position similar to the method disclosed by Schlosser et al. is disclosed, beginning with START 60.

In block 62, controller measures a quantity $x^+$ by grounding connections 44 and 50 while energizing corners 46 and 48. Controller 24 then reads the resulting quantity from A/D converter 56.

Operation continues to block 64 where controller 24 measures $x^-$ by energizing corners 44 and 50 while grounding corners 46 and 48.

In block 66, controller 24 measures the quantity $y^+$ by energizing corners 44 and 46 while grounding corners 48 and 50.

In block 68, controller 24 measures $y^-$ by grounding corners 44 and 46 while energizing corners 48 and 50.

Finally, controller 24 calculates position in block 70 from the following equations:

$$x = x^+/(x^+ + x^-) \tag{1}$$

$$y = y^+/(y^+ + y^-) \tag{2}$$

Figure 2:
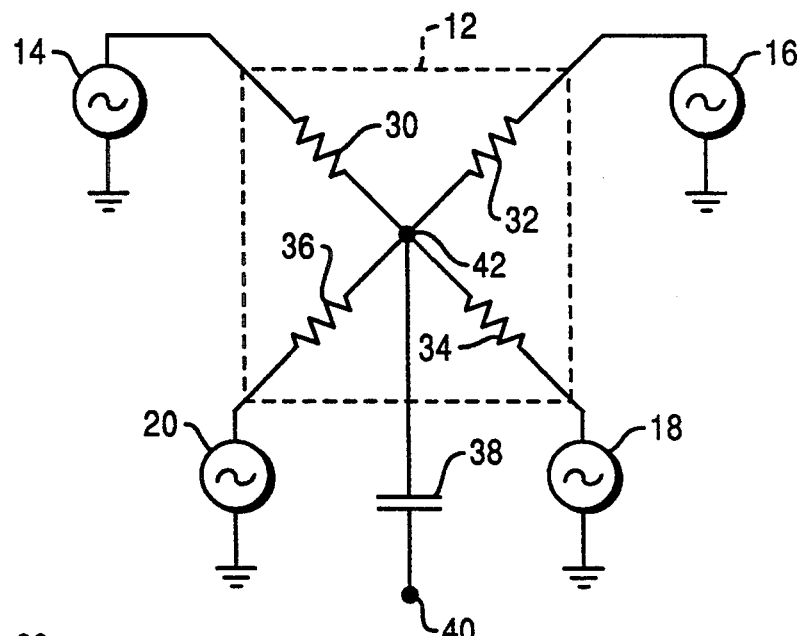
FIG. 2 is a schematic diagram of a digitizer.

As shown in FIG. 2, an idealized model of digitizer 12 and drivers 14–20 includes resistors 30–36, and capacitor 38. Resistors 30–36 model the resistive coating of digitizer 12, while capacitor 38 models the electrostatic coupling between the tip of stylus 21 at node 40 and the resistive coating at junction 42 of resistors 30–36.

Under the method of the present invention, position is expressed as a function of the states of drivers 14–20 and the resultant A/D converter readings. When controller 24 measures $x^+$ with drivers 16 and 18 on (energized) and drivers 14 and 20 off (grounded), $$x^+ = k\, v_{sum} \tag{7}$$

where constant k is equal to a scaling factor determined by the gain of front end 54 and the scale of A/D converter 56, and voltage $v_{sum}$ is equal to the voltage at node 40.

Since the circuit of FIG. 2 is linear, one can apply the principle of electrical superposition. Specifically, $$v_{sum} = v_1 + v_2 \tag{8}$$

where voltage $v_1$ equals the voltage at node 40 with driver 16 on and all other drivers off, and voltage $v_2$ equals the voltage at node 40 with driver 18 on and all other drivers off.

Substituting equation 8 into equation 7, one obtains:

$$x^+ = k(v_1 + v_2) \tag{9}$$

Similarly, one can show that:

$$x^- = k(v_0 + v_3) \tag{10}$$

$$y^+ = k(v_0 + v_1) \tag{11}$$

$$y^- = k(v_2 + v_3) \tag{12}$$

where voltage $v_0$ equals the voltage at node 40 with driver 14 on and all other drivers off, and voltage $v_3$ equals the voltage at node 40 with driver 20 on and all other drivers off.

Substituting equations (9) through (11) into equations (5) and (6), the constant k cancels out and one obtains:

$$x = (v_1 + v_2)/(v_0 + v_1 + v_2 + v_3) \tag{13}$$

$$y = (v_0 + v_1)/(v_0 + v_1 + v_2 + v_3) \tag{12}$$

For brevity, the drive patterns may be represented as follows. Each pattern has a unique name Pn, where n is a hexadecimal representation of a four bit nibble indicating the state of each driver. Bits 0, 1, 2, and 3 in this nibble represent the states of drivers 14–20 respectively. A "1" bit indicates that the corresponding driver is energized, while a "0" bit indicates that the corresponding driver is grounded.

With equations (13) and (14), one can use many different drive patterns to determine position. Take the pattern set $\{p_F, p_6, p_3\}$. By superposition, one can show that:

$$s_F = k(v_0 + v_1 + v_2 + v_3) \tag{15}$$

$$s_6 = k(v_1 + v_2) \tag{16}$$

$$s_3 = k(v_0 + v_1) \tag{17}$$

where the A/D converter reading resulting from a given drive pattern $p_n$ is $s_n$.

From this one can prove that:

$$x = s_6/s_F \tag{18}$$

$$y = s_3/s_F \tag{19}$$

Thus, with just three drive patterns one can measure position. In fact, there are thousands of unique and valid pattern sets: 8 three pattern sets, 945 four pattern sets, 2779 five pattern sets, etc..

Note that there is more than one way to calculate position given a valid pattern set. Also, not all patterns in a pattern set may be required, but they may simplify the positional equations significantly.

Figure 4:
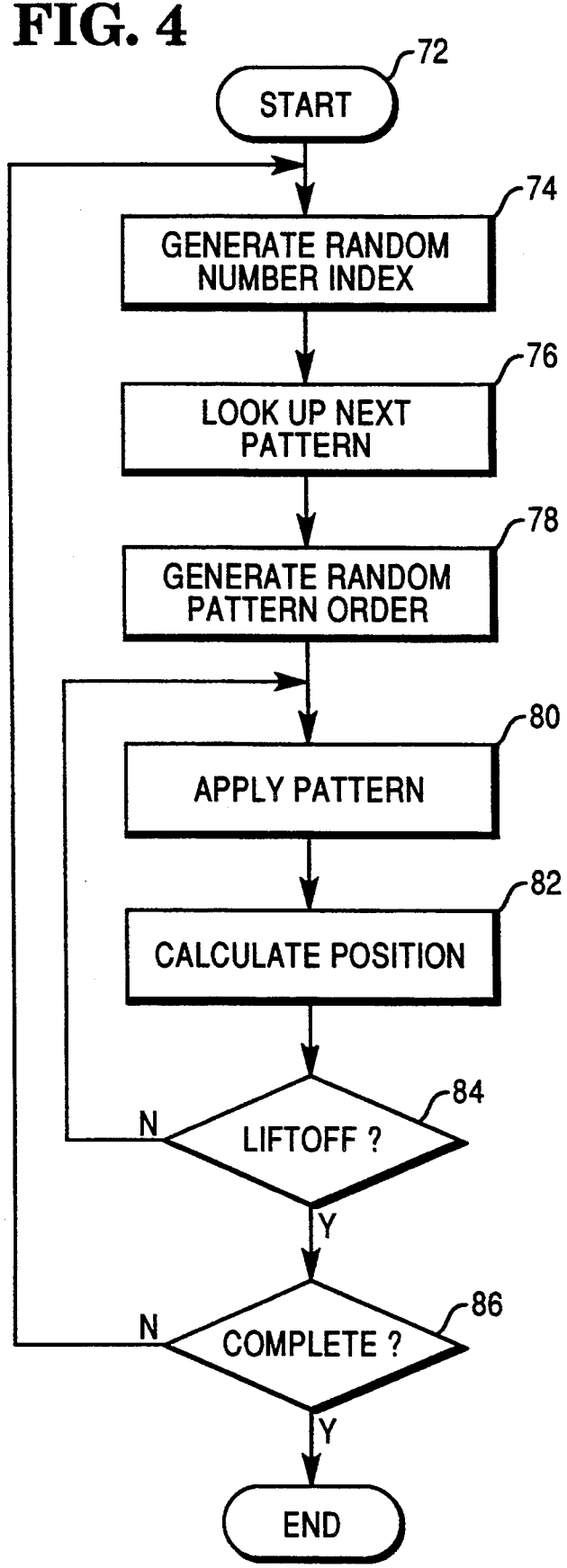
FIG. 4 is a flow diagram of a first embodiment of the method of the present invention.

Turning now to FIG. 4, a first embodiment of the method of the present invention is shown, starting with block 72. Continuing to block 74, controller 24 generates a random number index into the pattern set table. Methods for generating random numbers in software or hardware are common in the prior art. Controller 24 then looks up the indexed pattern set from the pattern set table in block 76.

In block 78, controller 24 generates a random pattern order and applies it in block 80.

In block 82, controller 24 calculates position.

In block 84, if controller 24 senses that stylus 21 remains in contact with digitizer 12, the procedure returns to block 80 and continues until liftoff of stylus 21 has occurred. If stylus 21 has lifted off of digitizer 12, the procedure continues to block 86. In block 86, if controller 24 is finished collecting points, the procedure terminates. Otherwise, the procedure returns to block 74.

The first embodiment is optimal for "point and shoot" applications, which include personal identification number (PIN) capture where the user is tapping digitizer 12 with stylus 21.

Referring now to FIG. 5, a second embodiment of the present invention is shown, beginning with START 90. In block 92, controller 24 generates a random number index into the pattern set table. Controller 24 then looks up the indexed pattern set from the pattern set table in block 94.

In block 96, controller 24 generates a random pattern order and applies it in block 98. Controller 24 calculates position in block 100. In block 102, if controller 24 is done collecting points, the procedure terminates. Otherwise, the procedure returns to block 92.

Under the second embodiment, controller 24 constantly varies the pattern stream in order to minimize the possibility of decoding. It is a simple matter to decode a constant pattern stream if one knows that the positional data occurs in continuous lines, as it does in handwriting. Constant variation of pattern stream is not necessary in point and shoot applications because there is not enough continuous position data. Thus, the second embodiment is optimal for handwriting capture, but may be used in point and shoot applications as well.

Both embodiments offer good security. The first embodiment may be desirable for some applications because it does not require as much controller overhead as the second embodiment. Constantly choosing a new pattern set and pattern order can be time consuming.

There are many ways to vary the pattern stream to make the decoding process more difficult for a potential thief, including breaking attempts at synchronizing pattern sets, increasing the number of drive patterns per pattern set, increasing the number of drive patterns utilized in the pattern stream, interleaving the pattern sets within the stream, randomly varying pattern order, randomly varying pattern set order within the pattern stream, and inserting invalid patterns and pattern sets within the pattern stream. Invalid patterns and pattern sets are those which do not yield position data.

Pattern set synchronization is knowing where each pattern set occurs in time. In order to decode the digitizer stylus signal, one must have synchronization. For example, suppose the pattern stream consists of pattern sets of four strung end to end. Without synchronization, any four consecutive pattern readings could represent a pattern set. The chances of guessing a valid pattern set are one in four. If the pattern stream is relatively constant and an unauthorized person establishes synchronization, that person can maintain it for the rest of the pattern stream.

Under the above scenario, there are several ways to ensure that synchronization cannot be maintained. These include adding one or more unrequired patterns at random or regular intervals and varying the number of drive patterns per set. Generally, the more drive patterns there are in a pattern set, the more possible permutations and combinations of patterns there are within the pattern set. The more pattern sets there are to choose from, the harder it is to decode an unknown pattern stream.

There is a limit to useful pattern set size. Too many drive patterns per set can actually decrease the number of permutations. For example, there are only sixteen unique permutations of fifteen patterns, and only one unique permutation of sixteen patterns.

Three, four, and five patterns per set is nominal, while four patterns per set is optimal. Pattern sets of one and two patterns do not yield positional data. There are only eight permutations of three pattern sets. Pattern sets of more than five contain too many dummy patterns and slow the digitizer point rate unnecessarily. Four pattern sets are the best compromise between the small number of permutations and combinations of three pattern sets and the slower point rate of five pattern sets.

Varying the number of drive patterns per set at regular or random periods is an even better compromise. Besides increasing the number of available drive patterns, this has the added effect of destroying synchronization.

As mentioned earlier, increasing the number of pattern sets is one way of varying pattern stream. Controller memory and performance constraints may prohibit using an unlimited number of them. Preferably, a subset of pattern sets may be stored away in a lookup table along with the corresponding positional equations. A random number may then serve as an index into the lookup table to select the next pattern to use in the stream. The more patterns there are in this lookup table, the harder it is to decode the sample stream.

Another method for varying the pattern stream involves interleaving the pattern sets. Interleaving is defined as meshing patterns from adjacent pattern sets. Interleaving adds more variation to the pattern stream.

Randomly varying pattern order within each pattern set makes the sample stream harder to decode.

Randomly varying pattern set order within the stream increases security by adding variation to the pattern stream.

Inserting an occasional invalid pattern or pattern set at random intervals increases security by destroying synchronization and adding more variation to the pattern stream.

As a final note, there are several ways to increase data security by modifying the digitizer hardware. For example, one could increase the number of possible states per driver. In the preferred embodiment of the present invention, a given driver can either ground or energize a given electrode. Alternatively, a given driver could either ground, energize, or leave a given electrode floating (undriven). In yet another embodiment, the drivers could utilize randomly varying amplitudes. More possible drive states mean exponentially more possible drive patterns and still more possible drive sets. Current sources are also envisioned for driving digitizer 12. The more possible drive sets there are, the more data secure the digitizer becomes.

Unfortunately, in voltage-driven systems such as that of the Schlosser et al patent, drive patterns utilizing open drivers are invalid. In the method of superposition, short circuits must replace all unused voltage sources or the method will not work. Alternatively, open circuits must replace unused current sources. Therefore, in digitizer circuits which drive the digitizer panel with constant current sources to determine position, drive patterns utilizing grounded drivers would be invalid.

Another way to increase data security is to add additional digitizer electrodes and drivers. The more drivers there are, the more drive patterns are available. These additional drivers need not be required to determine position. For example, a simple driver which can either ground or leave open an additional electrode between electrodes 48 and 50 in FIG. 1 would double the number of possible drive patterns and substantially increase the number of possible drive sets. Drive patterns with this new driver grounded would be invalid.

Although the present invention has been described with particular reference to certain preferred embodiments thereof, variations and modifications of the present invention can be effected within the spirit and scope of the following claims.

What is claimed is:

1. A digitizer panel control circuit comprising:
   a digitizer panel;
   a plurality of driver means for driving the digitizer panel with a randomly determined sequence of a plurality of different patterns of excitation signals, wherein each pattern defines a plurality of simultaneous states of the drivers, wherein the states include a high state and a grounded state, and wherein at least one of the patterns includes both of the states; and
   controller means for controlling the driver means, for choosing the randomly determined sequence of patterns, for choosing a plurality of additional randomly determined sequences of patterns, and for applying the one sequence and the additional sequences until the controller senses liftoff of the sensing means from the digitizer panel.

2. The digitizer panel control circuit as recited in claim 1, further comprising:
   sensing means for sensing the excitation of the digitizer panel; and
   processor means coupled to the sensing means and the controller means for processing the signal from the sensing means;
   wherein the controller means determines the point of contact between the sensing means and the digitizer panel from the processed signal from the sensing means.

3. The digitizer panel control circuit as recited in claim 2, further comprising:
   memory means coupled to the controller means for storing the plurality of different patterns.

4. The digitizer panel control circuit as recited in claim 3, wherein the sensing means comprises a stylus.

5. The digitizer panel control circuit as recited in claim 1, wherein the digitizer panel comprises four electrodes.

6. A digitizer panel control circuit comprising:
   a digitizer panel;
   a plurality of driver means for driving the digitizer panel with a randomly determined sequence of a plurality of different patterns of excitation signals, wherein each pattern defines a plurality of simultaneous states of the drivers, wherein the states include a high state and a plurality of low states, wherein the low states include a grounded state and a floating state, and wherein at least one of the patterns includes the high state and one of the low states; and
   controller means for controlling the driver means 7. A method for protecting digitizer panel data comprising the steps of:
   driving the digitizer panel with a randomly determined sequence of a plurality of different patterns of excitation signals, including the substep of defining a plurality of simultaneous states of the drivers to form each of the patterns, wherein the states include a high state and a grounded state, and wherein at least one of the patterns includes both of the states; and
   randomly varying the sequence.

8. The method as recited in claim 7, further comprising the steps of:
   sensing the excitation of the digitizer panel at a point on the digitizer panel to produce a signal;
   processing the signal;
   determining the location of the point from the processed signal.

9. The method as recited in claim 8, further comprising the step of:
   storing the plurality of different patterns.

* * * * *